United States Patent [19]

Yasotornrat

[11] Patent Number: 5,465,040
[45] Date of Patent: Nov. 7, 1995

[54] THREE PHASE POWER FACTOR CORRECTION DEVICE AND METHOD

[76] Inventor: Hemtong Yasotornrat, 110 Avenida Felipe, Anaheim Hills, Calif. 92807

[21] Appl. No.: 127,142

[22] Filed: Sep. 23, 1993

[51] Int. Cl.⁶ .................................................. G05F 1/70
[52] U.S. Cl. ................................... 323/210; 323/211
[58] Field of Search ................................ 323/209, 210, 323/211

[56] References Cited

U.S. PATENT DOCUMENTS

| | | | |
|---|---|---|---|
| 4,047,097 | 9/1977 | Gyugyi et al. | 323/211 |
| 4,193,111 | 3/1980 | Wester | 363/84 |
| 4,356,440 | 10/1982 | Curtiss et al. | 323/210 |
| 4,761,725 | 8/1988 | Henze | 363/46 |
| 4,886,952 | 12/1989 | Horiuchi | 323/210 X |
| 4,891,569 | 1/1990 | Light | 323/210 |
| 4,930,061 | 5/1990 | Slack et al. | 363/44 |
| 4,949,234 | 8/1990 | Gulczynski | 363/48 |
| 5,003,454 | 3/1991 | Bruning | 363/81 |
| 5,006,975 | 4/1991 | Neufeld | 363/80 |
| 5,045,991 | 9/1991 | Dhyanchand et al. | 363/89 |
| 5,047,910 | 9/1991 | Levran et al. | 363/41 |
| 5,113,337 | 5/1992 | Steigerwald | 363/98 |
| 5,121,316 | 6/1992 | Rensink et al. | 363/89 |
| 5,146,398 | 9/1992 | Vila-Masot et al. | 363/89 |
| 5,148,362 | 9/1992 | Braun et al. | 363/95 |
| 5,227,713 | 7/1993 | Bowler et al. | 323/210 X |

*Primary Examiner*—Peter S. Wong
*Assistant Examiner*—Y. Jessica Han
*Attorney, Agent, or Firm*—Harris, Tucker & Hardin

[57] ABSTRACT

In one form of the invention, a method for improving power factor in a multiple phase power distribution system coupled to a load is disclosed, comprising the steps of (a) sensing an actual voltage of each of the multiple phases, (b) sensing an actual current being sourced by each of the multiple phases, (c) calculating an ideal current value for each of the multiple phases such that each the ideal current is in phase with a respective one of the actual voltages, (d) coupling at least one energy storage device for sinking current from at least one of the multiple phases wherein the actual current is less than the ideal current and (e) coupling the energy storage device for sourcing current to at least one of the multiple phases wherein the actual current is greater than the ideal current. Other systems, devices and methods are disclosed.

11 Claims, 20 Drawing Sheets

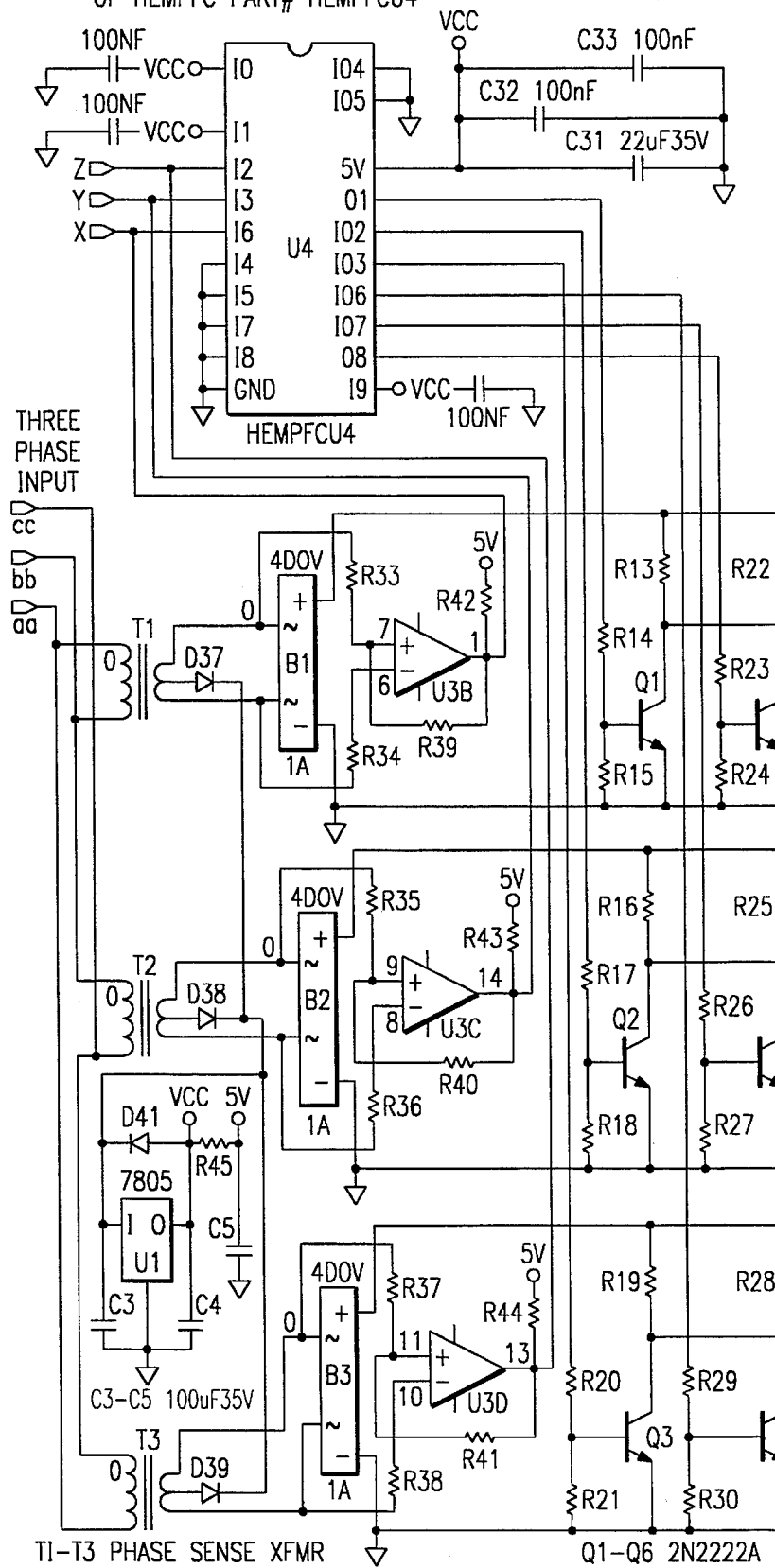
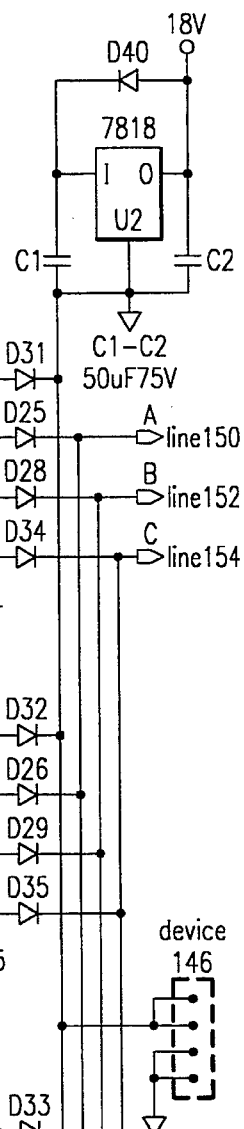
FIG. 16A
Voltage Current and Phase Sensing part of control board 122

Voltage Current and Phase Sensing
part of control board 122

DEVICE 160
part of control board 122

DEVICE 160
part of control board 122

Device 170
part of control board 122

THREE PHASE POWER FACTOR CORRECTION DEVICE AND METHOD

TECHNICAL FIELD OF THE INVENTION

The present invention relates generally to three phase power factor correction devices, and more particularly to three phase power factor correction devices employing direct compensation.

BACKGROUND OF THE INVENTION

In three phase power generation and transmission applications, much effort is expended in order to compensate for loads having less than ideal power factors. In an ideal electrical power distribution system, the transmitted alternating voltage and current should always be in phase. That is, any change in voltage should be accompanied by an instantaneous and proportional change in the current, with both waveforms having their zero-crossings at the same point in time. Such an ideal situation is shown in FIGS. 1A and 1B. FIG. 1B is a rotating vector diagram illustrating the phase relationship between the voltage and current waveforms of FIG. 1A. Since both waveforms are in phase, the voltage and current vectors coincide and there is no angle between them. This is the ideal condition in a power distribution system and occurs when the load that is drawing current from the power distribution system is purely resistive in nature (i.e. no reactive component to the load impedance). Power is transmitted most efficiently when there is no phase angle between the voltage and current waveforms.

In the past, electrical power providers have found that the loads presented to their power distribution systems have been, in the aggregate, inductive in nature rather than purely resistive. Such inductive loading is caused mainly by the transformers used at the power inputs of most electrical equipment. The inductive nature of the load causes the current to lag the voltage, as shown in FIGS. 2A and 2B. In other words, the instantaneous change in the current waveform occurs after some delay in the instantaneous change in the voltage waveform. It can be seen in FIG. 2A that the current waveform 10 is lagging the voltage waveform 12 because the zero crossing of the current waveform 10 occurs at a later point in time than the zero crossing of the voltage waveform 12. As seen in FIG. 2B, this lag is represented by an angle θ between the voltage and current vectors. The measure of the degree of current lag is called the power factor, and is expressed as the cosine of the angle n θ between the voltage and current waveforms:

Power Factor=cosine (θ)

The power factor is important in power transmission and distribution because the amount of power transferred to the load depends upon the power factor as follows:

Power=V * I cos(θ)

The power is maximized by maximizing cos(θ). Cos(θ) has a maximum value of one when θ equals zero. This is why power factor correction is important in power distribution systems. In the case of the inductive load of FIGS. 2A and 2B, the power transfer will be inefficient unless the value of θ is minimized (and preferably reduced to zero).

When the load presented to the power distribution system is inductive, a purely resistive load may be simulated by placing a capacitance in parallel with the load, as shown in FIGS. 3A and 3B. The capacitance value C is chosen such that the reactances of the added capacitance and the load's inductance cancel each other, leaving only the resistive component of the impedance. This is illustrated in the rotating vector diagram of FIG. 3B. If $I_{RESULT}$ is the desired current phase angle (i.e. the same phase angle as the voltage waveform), and $I_{LOAD}$ is the lagging phase angle caused by the inductive load, the capacitance C is chosen such that when placed in parallel with the inductive load, the leading current $I_C$ is produced. The lagging current $I_{LOAD}$ will then cancel with the leading current $I_C$, producing $I_{RESULT}$. In such a situation, the voltage and current will be in phase, the power factor will be cos(0)=1, and maximum power transmission efficiency is achieved.

In recent times, power distribution providers have encountered a shift from inductive loading to capacitive loading, mainly due to increased presence of computers and similar devices coupled to the power grid. FIGS. 4A and 4B illustrate the current lead produced by a capacitive load, in which the current waveform 14 leads the voltage waveform 16 by θ degrees. The power factor may be corrected in such situations, as shown in FIGS. 5A and 5B, by placing an inductance L in parallel with the capacitance of the load. The inductance L is chosen such that the reactances of the added inductance and the load's capacitance cancel each other, leaving only the resistive component of the impedance. This is illustrated in the rotating vector diagram of FIG. 5B. If $I_{RESULT}$ is the desired current phase angle (i.e. the same phase angle as the voltage waveform), and $I_{LOAD}$ is the leading phase angle caused by the capacitive load, the inductance L is chosen such that when placed in parallel with the capacitive load, the lagging current $I_L$, is produced. The leading current $I_{LOAD}$ will then cancel with the lagging current $I_L$, producing $I_{RESULT}$. In such a situation, the voltage and current will be in phase, the power factor will be cos(0)=1, and maximum power transmission efficiency is achieved.

Since the aggregate inductance or capacitance of the load is constantly changing as devices coupled to the power grid are turned on or off, the value and type of compensating reactance must be changed frequently. FIG. 6A illustrates a normal contaminated distribution current that results from a combination of inductive loads and capacitor filter rectifier loads. The rectified current is contrasted with an ideal sine waveform. In order to correct the power factor of this type of current waveform with minimum difficulty, most prior art systems use power semiconductor switches to couple or uncouple capacitive or inductive loads into the power distribution system as needed. Such a system is illustrated in FIG. 6B, where an inductance L may be placed in parallel with the load by closing switch SL, and/or capacitance C may be placed in parallel with the load by closing switch SC. When the load is sensed by the system to be capacitive (leading current), the switch SL is closed and the switch SC is opened, thereby placing the inductance L in parallel with the load. On the other hand, when the load is sensed by the system to be inductive (lagging current), the switch SC is closed and the switch SL is opened, thereby placing the capacitance C in parallel with the load.

Such systems have many disadvantages. First, they are typically large and expensive, due to the large amounts of capacitance or inductance that must be made available for switching into parallel with the load. Also, these devices correct the power factor by introducing counter currents that cancel the leading or lagging current drawn by the load. In other words, the power factor corrector attempts to solve the problem by an indirect method (creating additional canceling currents). Therefore the power factor correcting device becomes an additional load, consuming power and increasing the required current generation capacity of the power distribution system.

It will be appreciated by those skilled in the art that the prior art power factor correction methods are cumbersome in that they require large banks of capacitors and/or inductors that may be switched into and out of the load circuit. Additionally, the prior art devices are inefficient because they introduce additional loading into the power distribution grid, requiring more current to be generated. Accordingly, a three phase power factor correction device which overcomes any or all of these problems is highly desirable. The present invention is directed toward meeting these needs.

SUMMARY OF THE INVENTION

It is therefore the object of the present invention to provide a device which can provide power factor correction in a three phase system, in order to eliminate the need for coupling external reactive loads to the real load in order to achieve ideal power factor.

To overcome the problems inherent in the prior art devices, the present invention incorporates a novel digital processing and switching system that draws current from phases with an instantaneous current draw deficiency for ideal power factor and feeds that current to phases with an instantaneous excess current draw for ideal power factor.

At any instant, controlled by load detectors and logic controllers, the present invention will draw from phase A just the right amount of current to perform power factor correction, that is, to make the current in phase with the voltage. This drawn energy is temporarily stored in an inductor within the device of the present invention. This operation makes the power source see a perfect power factor for phase A.

When the drawn energy reaches the ideal magnitude, as calculated by the device of the present invention from the average current in phase A and a model of perfect sine wave form, this energy is fed back to either phase B or phase C as required at that instant in time.

In a like manner, the invention draws current from phase B and stores it in an internal inductor. This stored energy is then fed to either phase C or phase A as needed to achieve ideal power factor. Also at the same instant, the invention draws current from phase C and stores the energy in another internal inductor. This energy may then be fed to either phase A or phase B as required for power factor correction.

In one form of the invention, a device for improving power factor in a multiple phase power distribution system coupled to a load is disclosed, comprising at least one energy storage device, first switching means operatively coupled between an input of the energy storage device and each of the multiple phases, second switching means operatively coupled between an output of the energy storage device and each of the multiple phases and control means operatively coupled to the first and second switching means, the control means operable to open or close the first switching means in order to couple the energy storage device for sinking current from at least one of the multiple phases which is supplying less than an ideal amount of current to the load, and further operable to control the second switching means in order to couple the energy storage device for sourcing current to at least one of the multiple phases which is supplying more than an ideal amount of current to the load.

In another form of the invention, a method for improving power factor in a multiple phase power distribution system coupled to a load is disclosed, comprising the steps of (a) sensing an actual voltage of each of the multiple phases, (b) sensing an actual current being sourced by each of the multiple phases, (c) calculating an ideal current value for each of the multiple phases such that each the ideal current is in phase with a respective one of the actual voltages, (d) coupling at least one energy storage device for sinking current from at least one of the multiple phases wherein the actual current is less than the ideal current and (e) coupling the energy storage device for sourcing current to at least one of the multiple phases wherein the actual current is greater than the ideal current.

BRIEF DESCRIPTION OF THE DRAWINGS

The novel features believed to be characteristic of the invention are set forth in the appended claims. For a more complete understanding of the present invention, and for further details and advantages thereof, reference is now made to the following Detailed Description taken in conjunction with the accompanying drawings, in which:

It is to be expressly understood, however, that the drawings are for purposes of illustration only and are not intended as a definition of the limits of the invention. Such definition is made only by the appended claims.

DETAILED DESCRIPTION OF THE DRAWINGS

The present invention relates to power factor correction in three phase power generation and distribution systems. Unlike prior art methods of power factor correction which introduce shunt reactors across the load to partially resonate with the reactive characteristics of the load in order to make the load appear resistive, the present invention does not require additional loading of the power source for power factor correction. Instead, the current in each phase is forced to coincide in phase with the sinusoidal voltage of that phase by adding or subtracting current from the phase, as required.

Figure 1A:
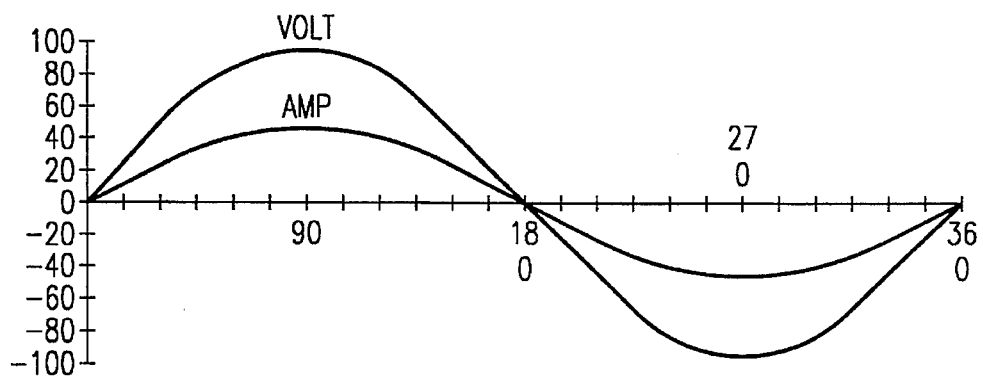
FIG. 1A is a waveform diagram of an ideal voltage and current relationship.
Figure 1B:
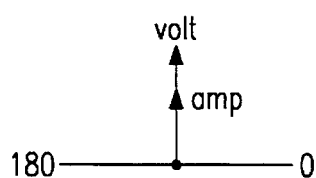
FIG. 1B is a rotating vector diagram of the voltage and current waveforms of FIG. 1A.
Figure 2A:
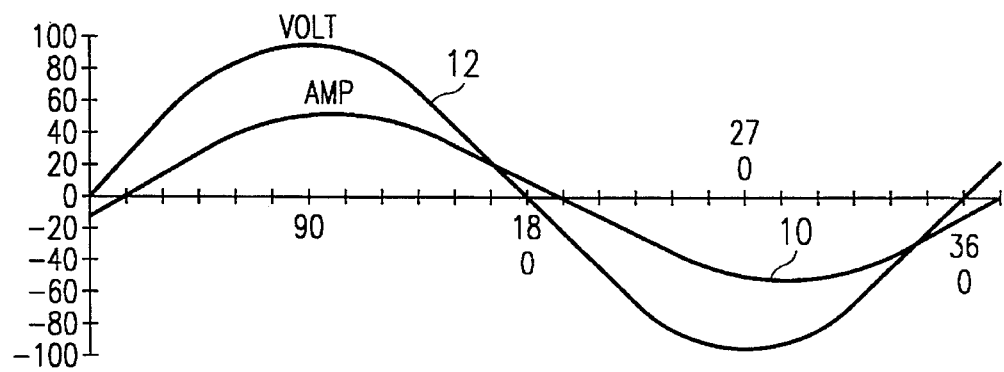
FIG. 2A is a waveform diagram of a typical voltage and current relationship produced by an inductive load.
Figure 2B:
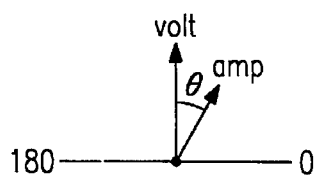
FIG. 2B is a rotating vector diagram of the voltage and current waveforms of FIG. 2A.
Figure 3A:
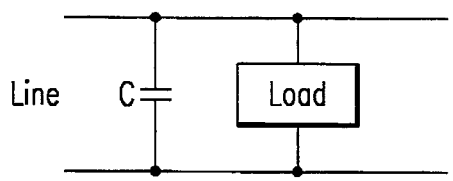
FIG. 3A is a schematic diagram of a prior art capacitive power factor correction device.
Figure 3B:
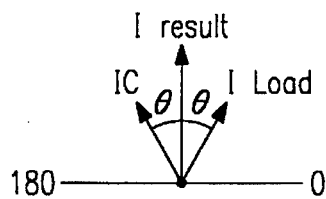
FIG. 3B is a rotating vector diagram of the currents produced by the circuit of FIG. 3A.
Figure 4A:
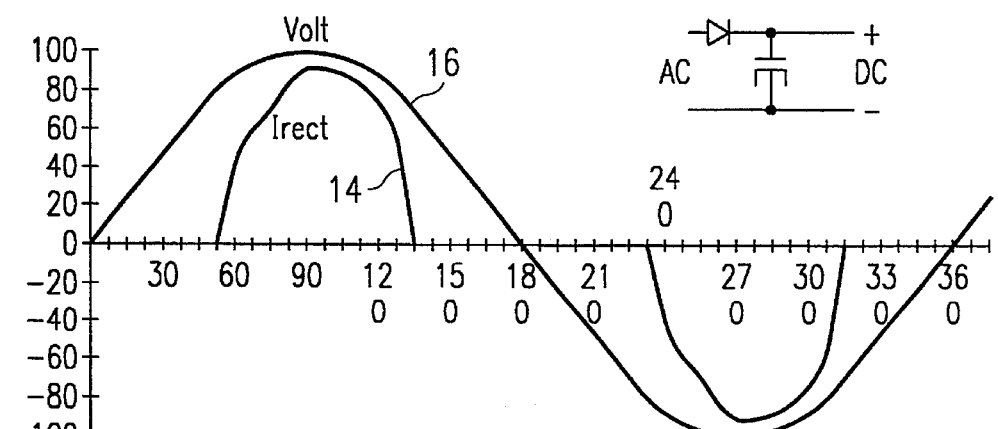
FIG. 4A is a waveform diagram of a typical voltage and current relationship produced by a capacitive load.
Figure 4B:
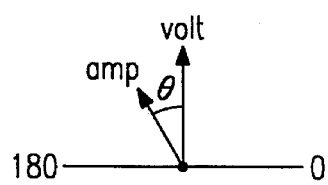
FIG. 4B is a rotating vector diagram of the voltage and current waveforms of FIG. 4A.
Figure 5A:
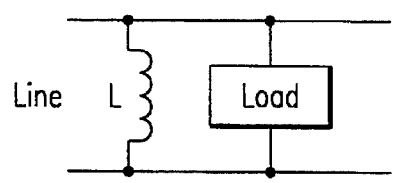
FIG. 5A is a schematic diagram of a prior art inductive power factor correction device.
Figure 5B:
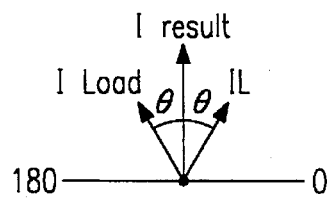
FIG. 5B is a rotating vector diagram of the currents produced by the circuit of FIG. 5A.
Figure 6A:
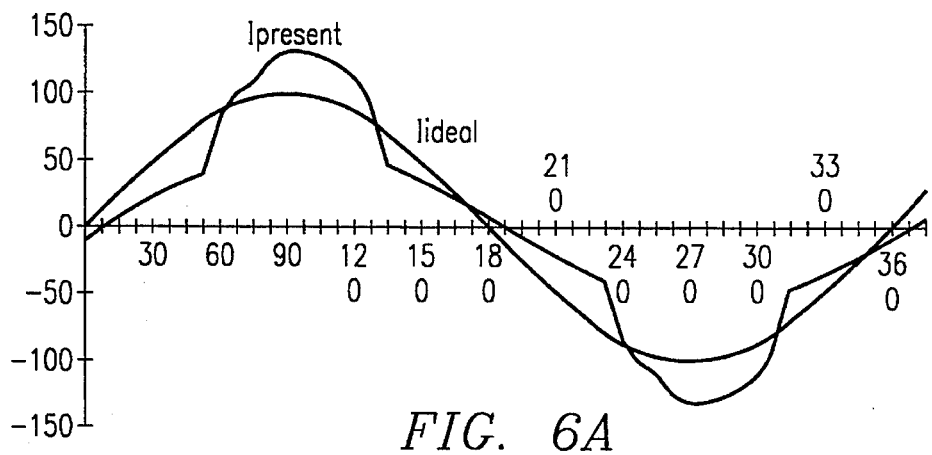
FIG. 6A is a waveform diagram of the normal contaminated distribution currents resulting from a combination of inductive loads and capacitor filter rectifier loads.
Figure 6B:
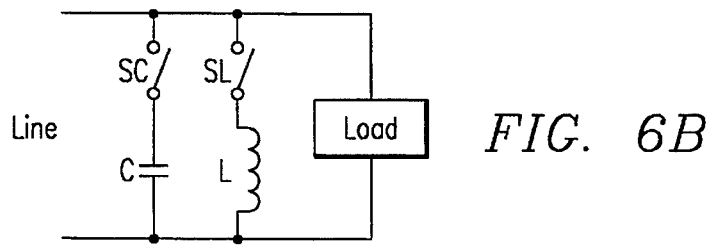
FIG. 6B is a schematic diagram of a prior art power factor correction device that may be operated as inductive or capacitive.
Figure 7:
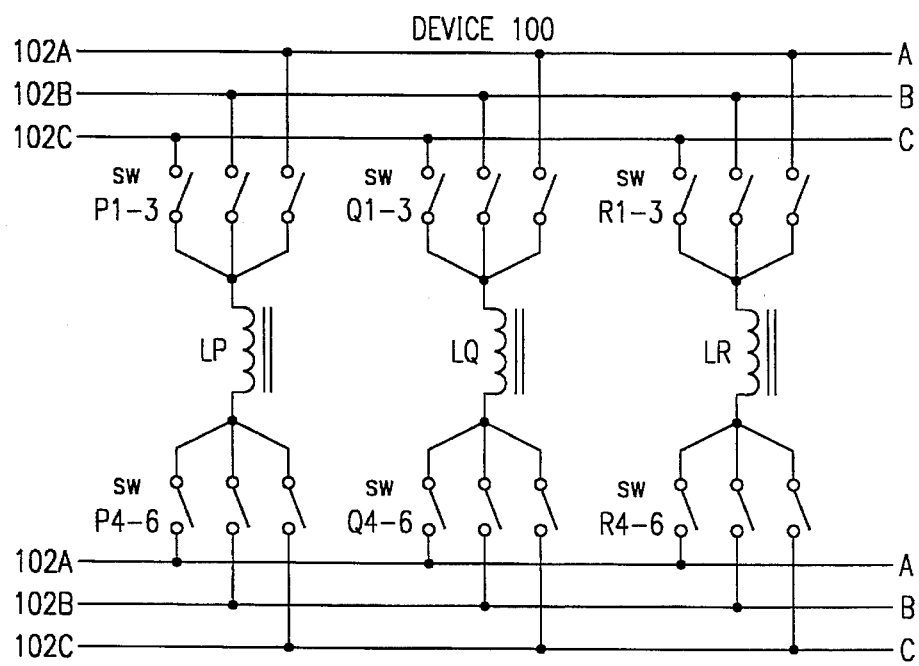
FIG. 7 is a schematic diagram of a first embodiment of the present invention.

Referring to FIG. 7, there is illustrated a schematic block diagram of a first embodiment of the present invention, indicated generally at 100. Three phase power lines 102A, 102B and 102C may be selectively coupled to storage inductors LP, LQ and LR via switches P1–P6, Q1–Q6 and R1–R6, respectively. It will be appreciated by those skilled in the art that by this arrangement, each of the storage inductors LP, LQ or LR may be coupled between any pair of the three phase power lines 102A–C. At any instantaneous moment, the circuit of FIG. 7 allows energy from at least one power line to be withdrawn and stored in at least one of the inductors LP, LQ or LR. Additionally, energy may be transferred from at least one of the storage inductors LP, LQ or LR to at least one of the power lines 102A–C. In this way, additional current may be drawn from one power line 102A–C and stored in inductors LP, LQ or LR if the current being drawn by the load is less than the ideal current draw for a power factor of one. This stored energy may then be transferred to another power line 102A–C that is drawing more than the amount of current that will result in an ideal power factor, thereby correcting the instantaneous power factor in both phases. In a preferred embodiment, such correction is performed at every degree in the voltage waveform. Therefore, in a 60 Hertz power generation system, the power factor correction of FIG. 7 is adjusted 360 * 60=21,600 times per second.

Table 1 provides definitions of the various currents used to describe the operation of the present invention in greater detail hereinbelow.

TABLE 1

| Current Designations | |
|---|---|
| Current | Definition |
| $I_{ideal}$ | The ideal current that is a clean sine wave and is in phase with the applied voltage. |
| $I_{present}$ | The instantaneous current present without any power factor correction. |
| $I_{draw}$ | The current being drawn by the present invention from a phase with an instantaneous current draw deficiency. |
| $I_{feed}$ | The current being added by the present invention to a phase with excess instantaneous current draw. |

In order to determine the amount and type of correction required for each phase 102A–C, an ideal reference sinusoidal current waveform must be constructed for comparison to the present current waveform. To do this, the present invention calculates the average current being drawn in each of the phases 102A–C and then creates a model sine wave for each phase, $I_{ideal}$, having the same average current value. The present invention uses $I_{ideal}$ as a current reference to control and limit the current drawn from each of the phases 102A–C to a sinusoidal wave form in phase with the voltage waveform. Since the resulting current is being drawn exactly proportional to the current that would be drawn by a purely resistive load, the voltage and current are in-phase and a perfect power factor is obtained.

Figure 8:
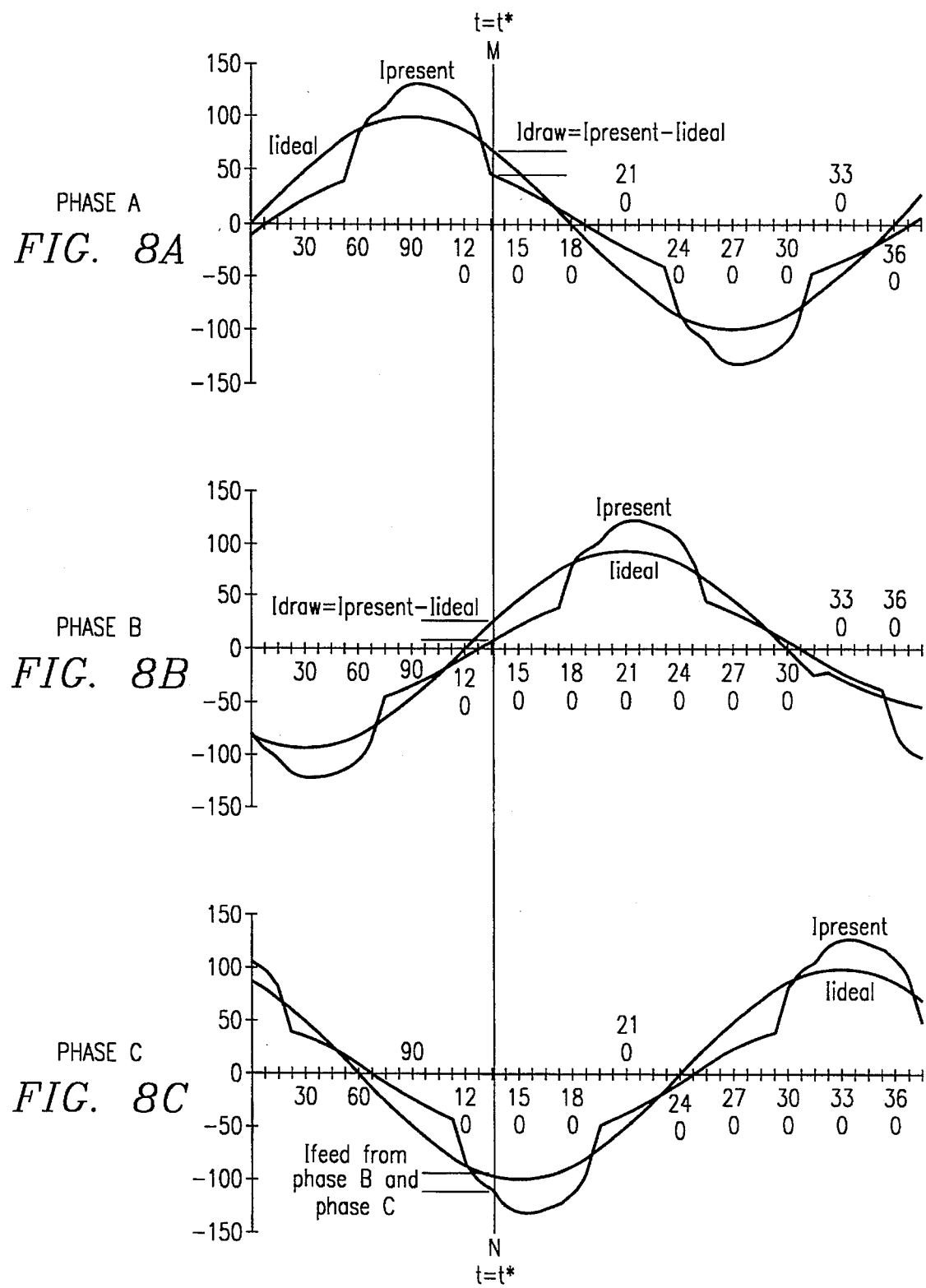
FIG. 8 is a current waveform diagram used to illustrate the operation of the present invention.

Referring now to FIG. 8, the current waveforms for each of the phases 102A–C are shown, with section M–N indicating the instant in time used for the following example. At the instant of time M–N, phase 102C is delivering the highest power, so the device 100 will draw current from phases 102A and 102B as follows:

$$IA_{draw} = I_{present} - IA_{ideal}$$

$$IB_{draw} = IB_{present} - IB_{ideal}$$

$IA_{draw}$ is stored in inductor LP and $IB_{draw}$ is stored in inductor LQ. This is accomplished by closing switches P3 and Q2, respectively. The device 100 will then feed the stored energy in LP and/or LQ to phase 102C by closing switch P6 and/or Q6 as required until $$IC_{present} = IC_{ideal}.$$

Similarly, if at the instant of time M–N phase 102A is delivering the highest power, the device 100 will draw current from phases 102B and 102C as follows:

$$IB_{draw} = IB_{present} - IB_{ideal}$$

$$IC_{draw} = IC_{present} - IC_{ideal}$$

$IB_{draw}$ is stored in inductor LQ and $IC_{draw}$ is stored in inductor LR. This is accomplished by closing switches Q2 and R1, respectively. The device 100 will then feed the stored energy in LQ and/or LR to phase 102A by closing switch Q4 and/or R4 as required until $$IA_{present} = IA_{ideal}.$$

Finally, if at the instant of time M–N phase 102B is delivering the highest power, the device 100 will draw current from phases 102A and 102C as follows:

$$IA_{draw} = IA_{present} - IA_{ideal}$$

$$IC_{draw} = IC_{present} - IC_{ideal}$$

$IA_{draw}$ is stored in inductor LP and $IC_{draw}$ is stored in inductor LR. This is accomplished by closing switches P3 and R1, respectively. The device 100 will then feed the stored energy in LQ and/or LR to phase 102A by closing switch P5 and/or R5 as required until $$IB_{present} = IB_{ideal}.$$

Figure 9:
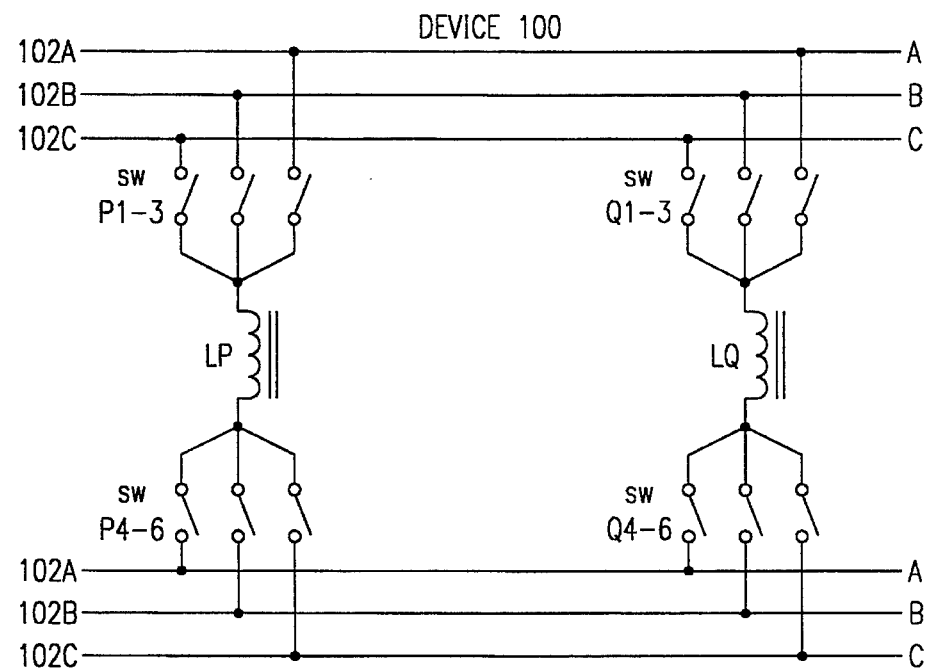
FIG. 9 is a schematic diagram of a second embodiment of the present invention.
Figure 10:
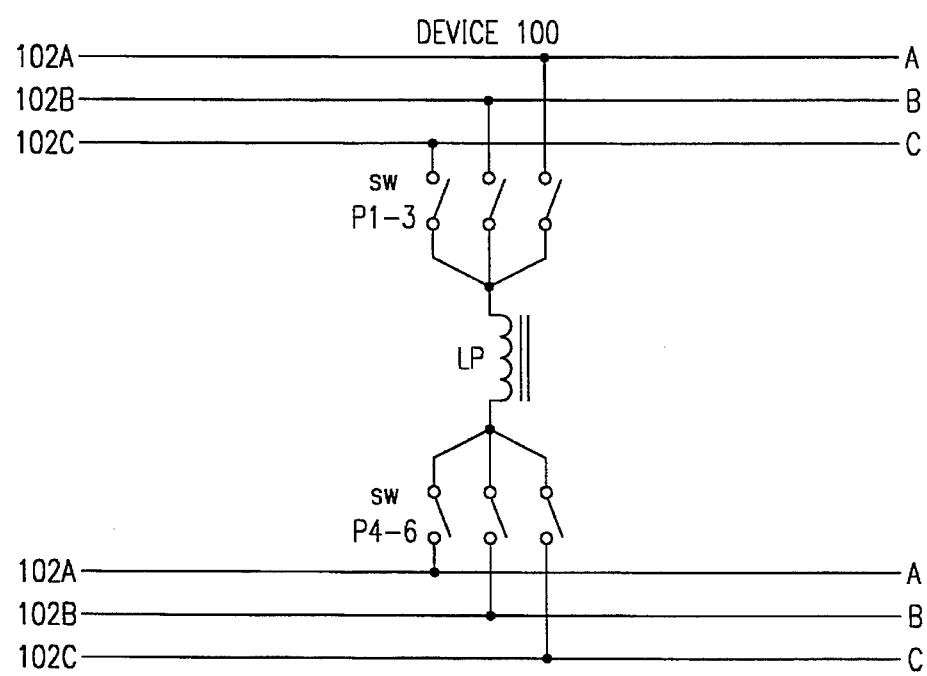
FIG. 10 is a schematic diagram of a third embodiment of the present invention.

As illustrated schematically in FIGS. 9 and 10, respectively, the device 100 may alternatively be constructed with two energy storage inductors or with only one energy storage inductor. Other designs with more than three energy storage inductors are also contemplated by the present invention.

Figure 11:
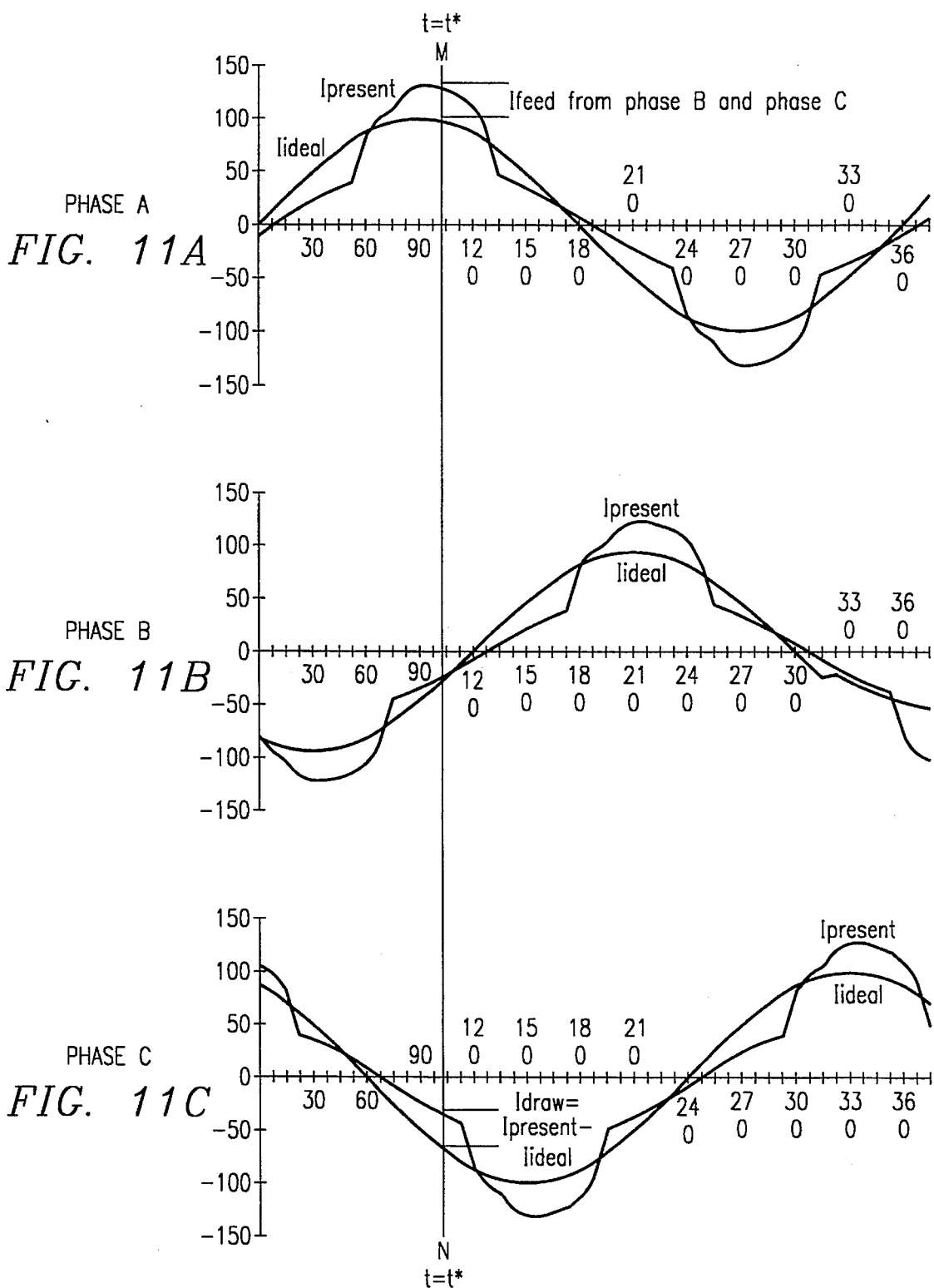
FIG. 11 is a waveform diagram of a three phase current.

The power factor correction method of the present invention is illustrated graphically in FIG. 11, which shows phases A, B, and C current waveforms on separate axes A, B and C, respectively. Ideal currents (for ideal power factor) are represented as dashed lines and are labeled, respectively, $IA_{ideal}$, $IB_{ideal}$ and $IC_{ideal}$. It will be appreciated by those skilled in the art that the three ideal current waveforms are separated from each other by 120 degrees. Also illustrated in FIG. 11 are the actual currents $I_A$, $I_b$ and $I_c$, which lag the ideal currents in this example. At time t=t*, indicated by the section line, phase A is drawing more current from the power grid than is ideal, phase C is drawing less than ideal current, and phase B is drawing exactly the ideal amount of current. At this point in time, it would be desirable for phase C to draw more current from the power grid, thereby aligning $I_C$ with $IC_{ideal}$. Therefore, switch R3 and R4 can be closed (see FIG. 7), drawing more current from phase C and storing the energy in inductor LR. Additionally at t=t*, it would be desirable for phase A to draw less current from the power grid, thereby aligning $I_A$ with $IA_{ideal}$. However, the electrical devices connected to phase A require at t=t* the amount of power indicated by $I_A$. If the amount of current drawn from phase A of the power grid is reduced in order to raise the power factor, that amount of current has to be compensated for. This may be conveniently done by closing switch R2 and R4, thereby connecting inductor LR to phase A and supplying the additional current to phase A. Hence, more current is drawn from phase C than is needed to supply the electrical devices connected to phase C, and this excess current is supplied to phase A, whose connected electrical devices require more current than we wish to draw from the power grid in order to maintain a power factor of one. Since $I_B = IB_{ideal}$ at t=t*, no current is drawn from or supplied to phase B at t=t*.

The device of FIG. 7 will perform the ideal current deviation analysis and current shifting operations described above at each succeeding time t. In a first embodiment, this is performed 21,600 times per second, or every degree of the current waveform in a 60 cycle per second signal.

Figure 12:
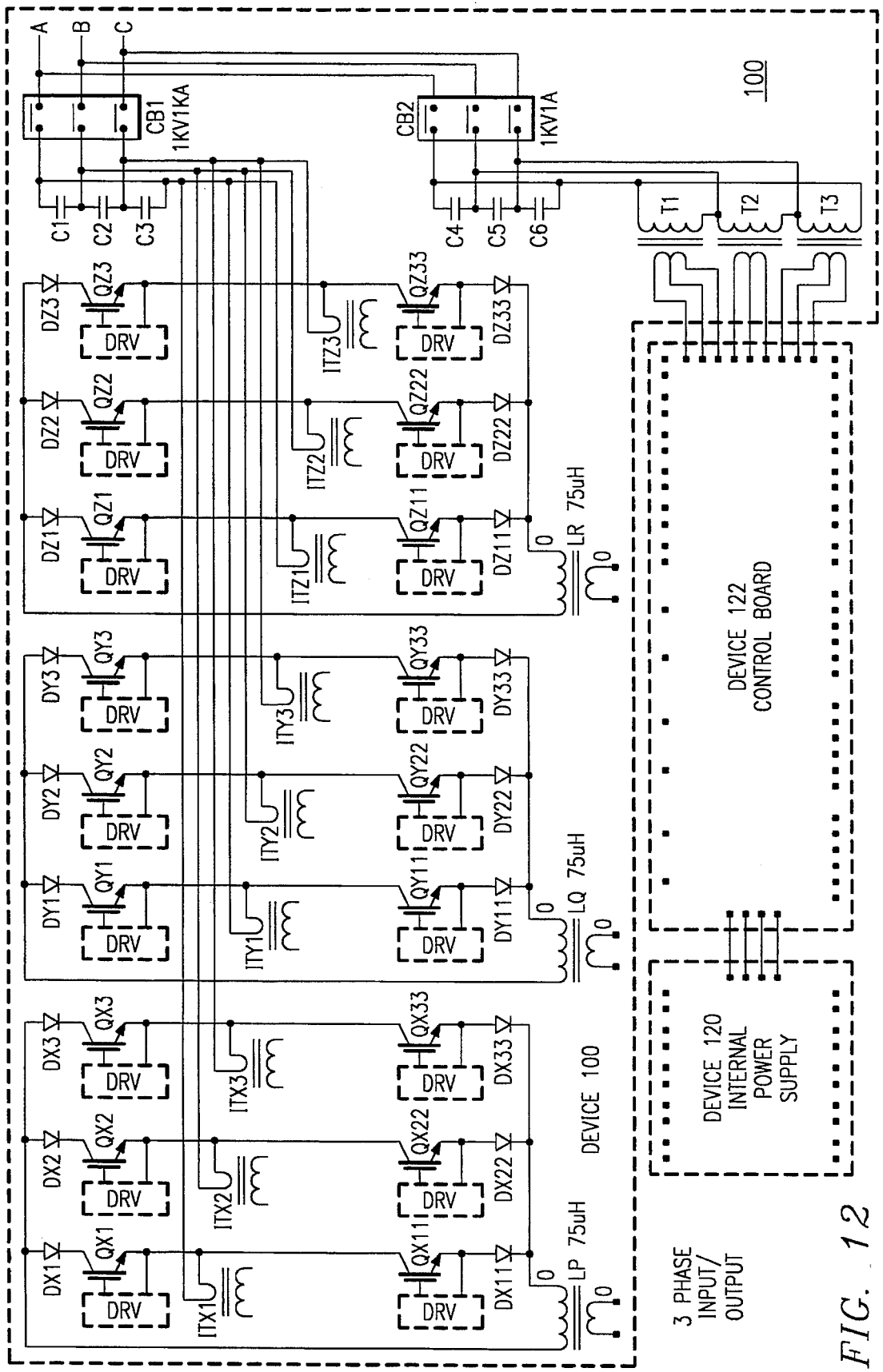
FIG. 12 is a schematic diagram of a first embodiment design of the device of FIG. 7.
Figure 12A:
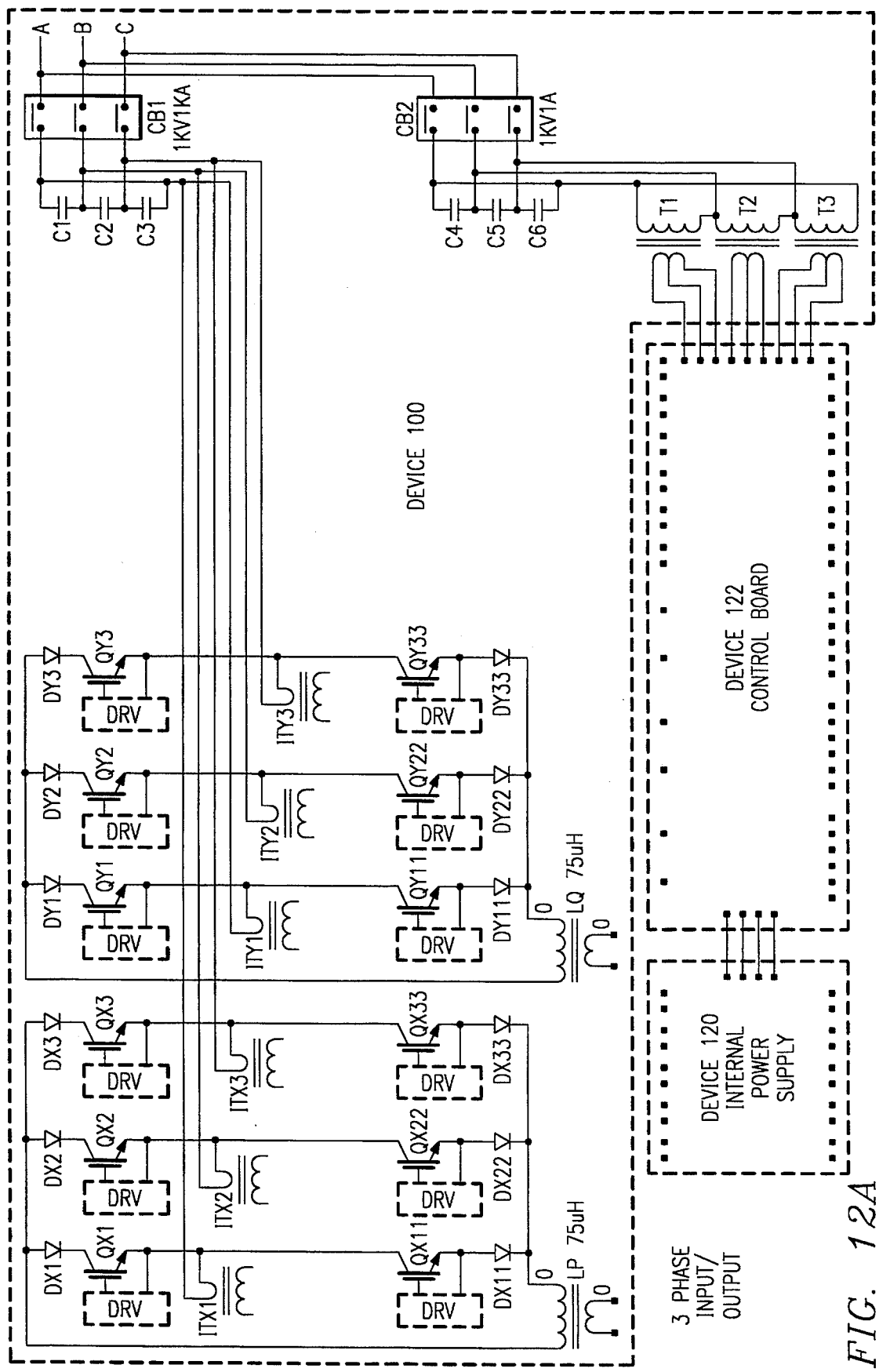
FIG. 12A is a schematic diagram of a first embodiment design of the device of FIG. 9.
Figure 12B:
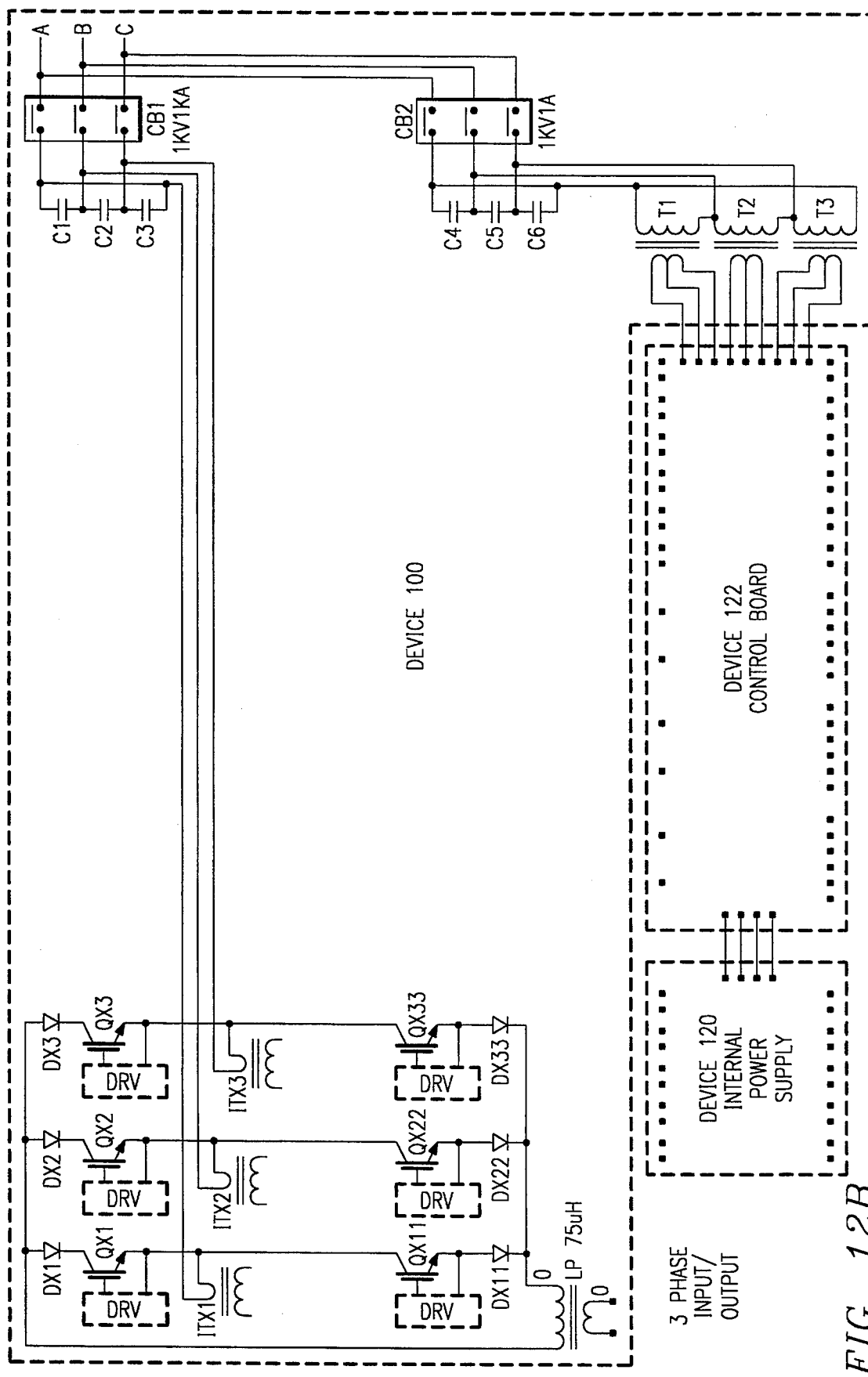
FIG. 12B is a schematic diagram of a first embodiment design of the device of FIG. 10.

Referring now to FIG. 12, there is illustrated a first embodiment schematic diagram of the device of FIG. 7. Each of the inductors LP, LQ and LR are illustrated as 75 µH inductors by way of example. Switches P1 is represented as QX1 and associated driver, switch P4 is represented as QX11 and associated driver, etc. A detailed schematic diagram for each such pair of switches and drivers is illustrated in FIG. 14. Internal power supply 120 is illustrated in greater detail in FIG. 15. Control board 122, which incorporates voltage, current and phase sensing, sinusoidal current control and switching logic, is illustrated in greater detail in FIGS. 16–18. Analogously, FIGS. 12A and 12B illustrate respective first embodiments schematic diagrams of the device 100 of FIGS. 9 and 10. A second embodiment schematic diagram of the device 100 of FIGS. 7, 9 and 10 are respectively illustrated in FIGS. 13, 13A and 13B. The only difference between the first and second embodiment devices is the placement of the diodes associated with each switch/driver. The functioning of both circuits is identical.

Figure 13:
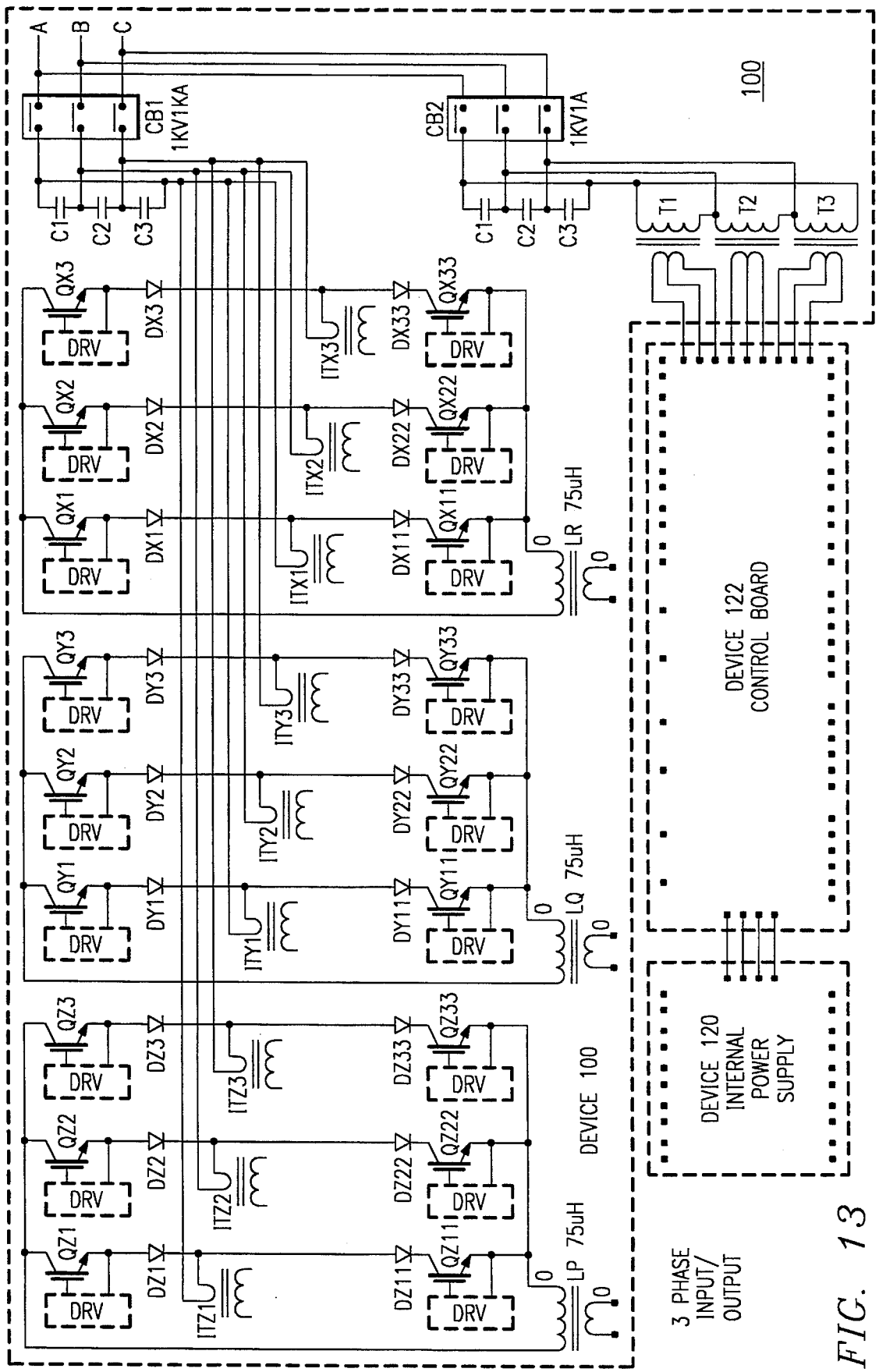
FIG. 13 is a schematic diagram of a second embodiment design of the device of FIG. 7.
Figure 13A:
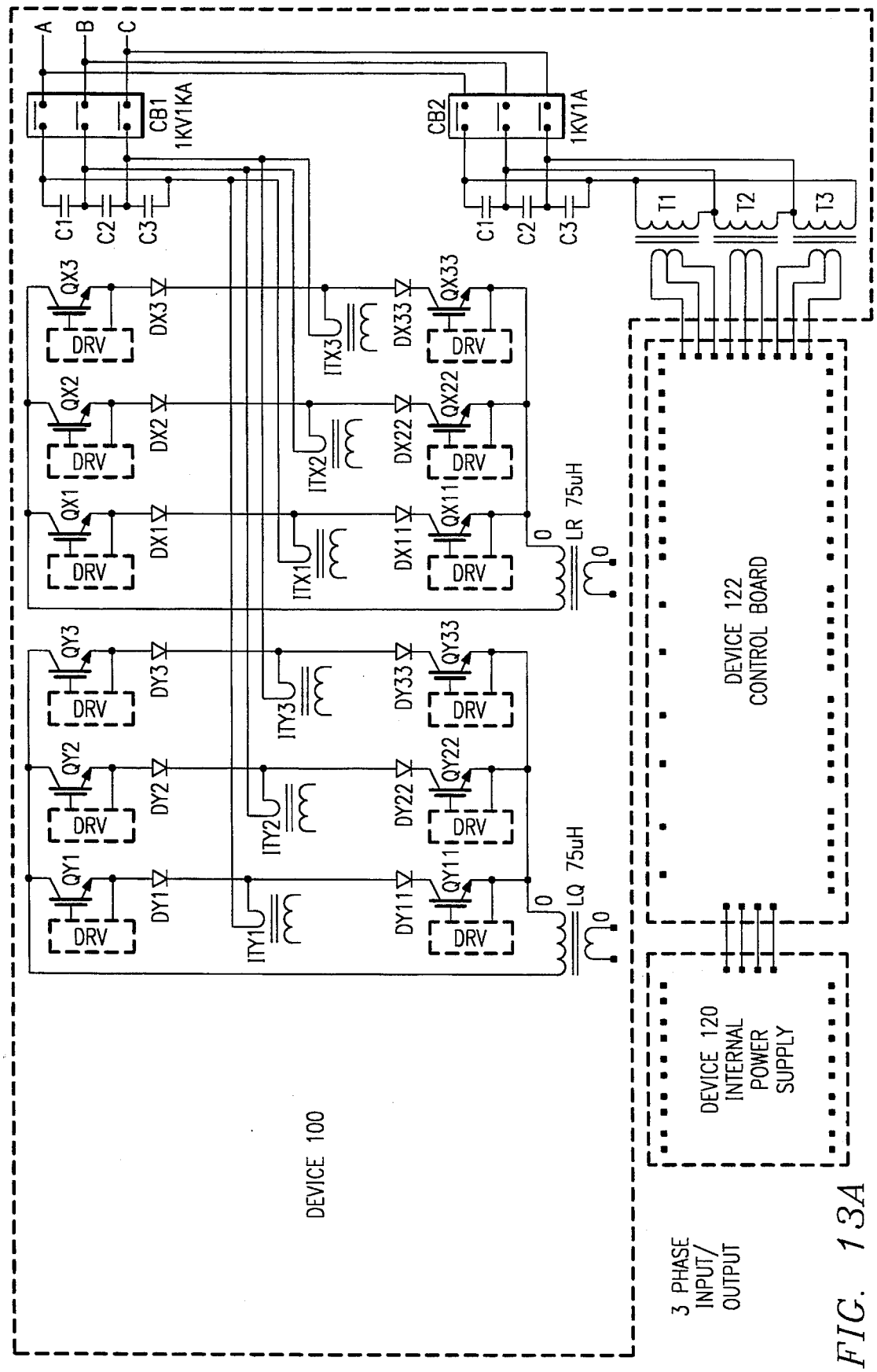
FIG. 13A is a schematic diagram of a second embodiment design of the device of FIG. 9.
Figure 13B:
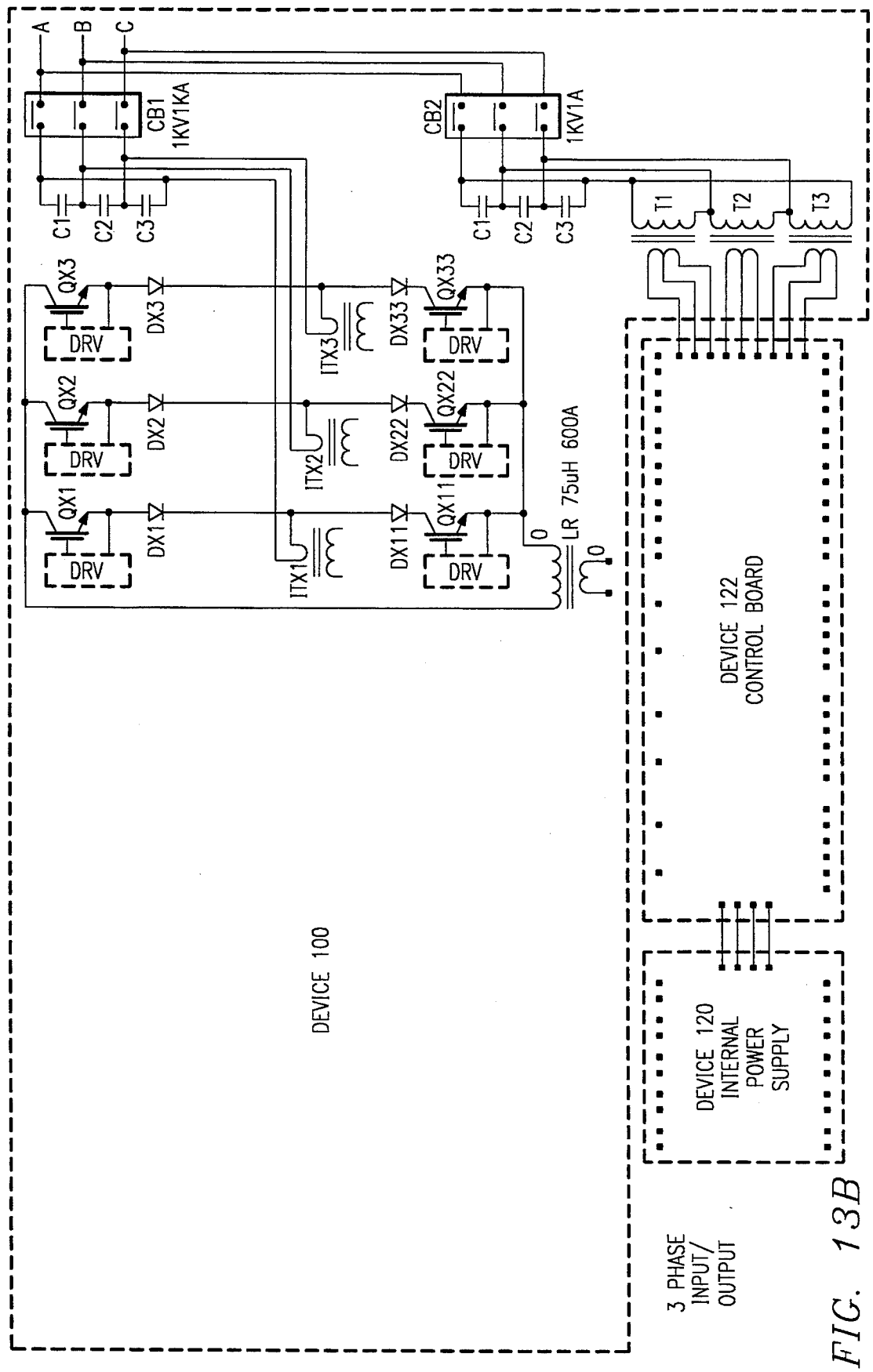
FIG. 13B is a schematic diagram of a second embodiment design of the device of FIG. 10.
Figure 14A:
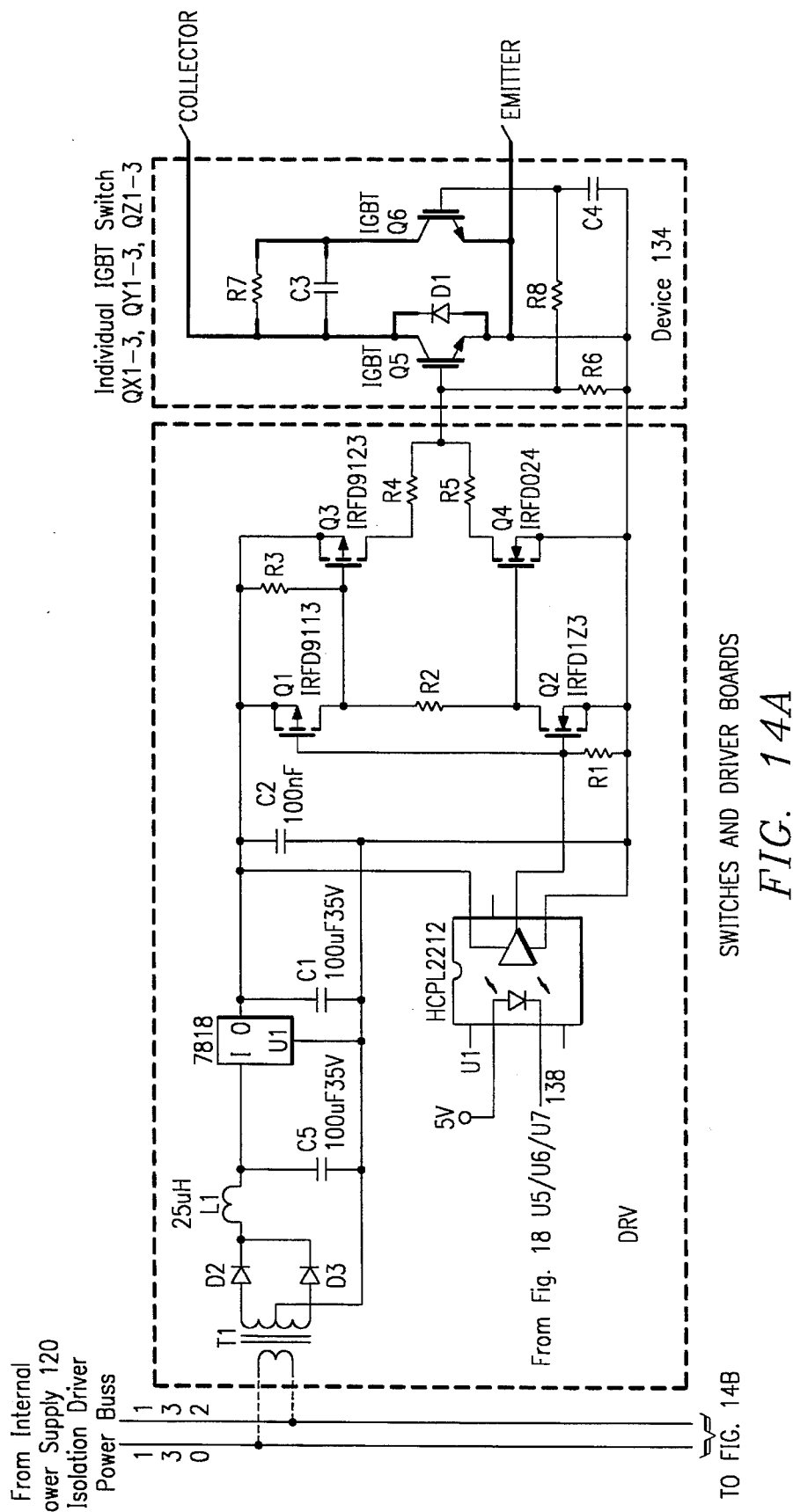
FIG. 14 is a schematic diagram of the switch/driver pairs of the devices of FIGS. 12 and 13.
Figure 14B:
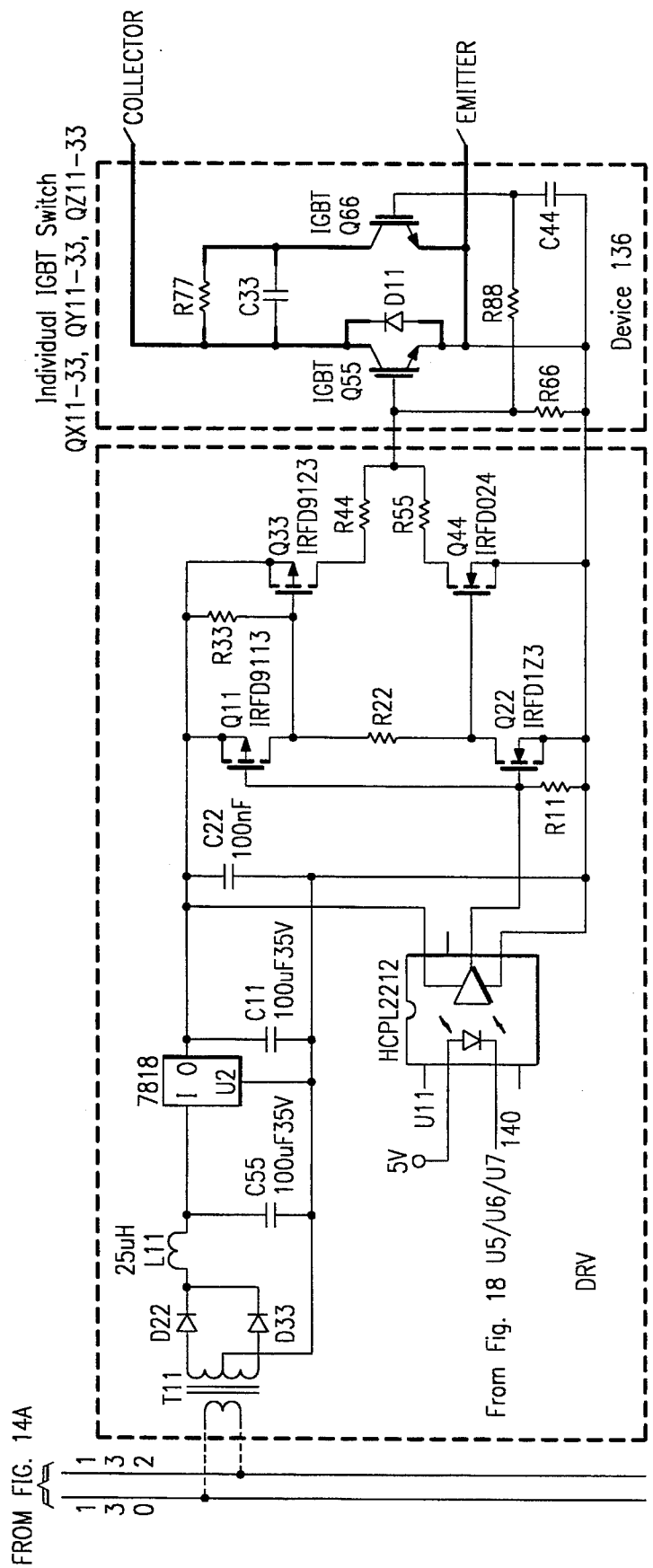

Referring now to FIG. 14, there is illustrated a schematic diagram of one pair of the switch/drivers of FIGS. 12 and 13. Power lines 130 and 132 are provided from the internal power supply 120. The switches 134 and 136 of the pair were illustrated schematically in FIGS. 12 and 13 as transistors QX1–3, QX11–33, QY1–3, QY11–33, QZ1–3 and QZ11–33, but as illustrated in FIG. 14 these switches actually comprise the components within the boxes 134 and 136. The IGBT transistors may be, for example, Toshiba part number MG600Q1US41. The two outputs of each switch 134 and 136 are illustrated as the respective collector and emitter of transistors QX1–3, QX11–33, QY1–3, QY11–33, QZ1–3 and QZ11–33 in FIGS. 12 and 13. The circuit portion outside of the boxes 134 and 136 represent the driver circuitry for driving the switches 134 and 136. Inputs 138, 140, 142 and 144 to the driver circuits are provided by the switching logic of control board 122 (see FIG. 18).

Figure 15:
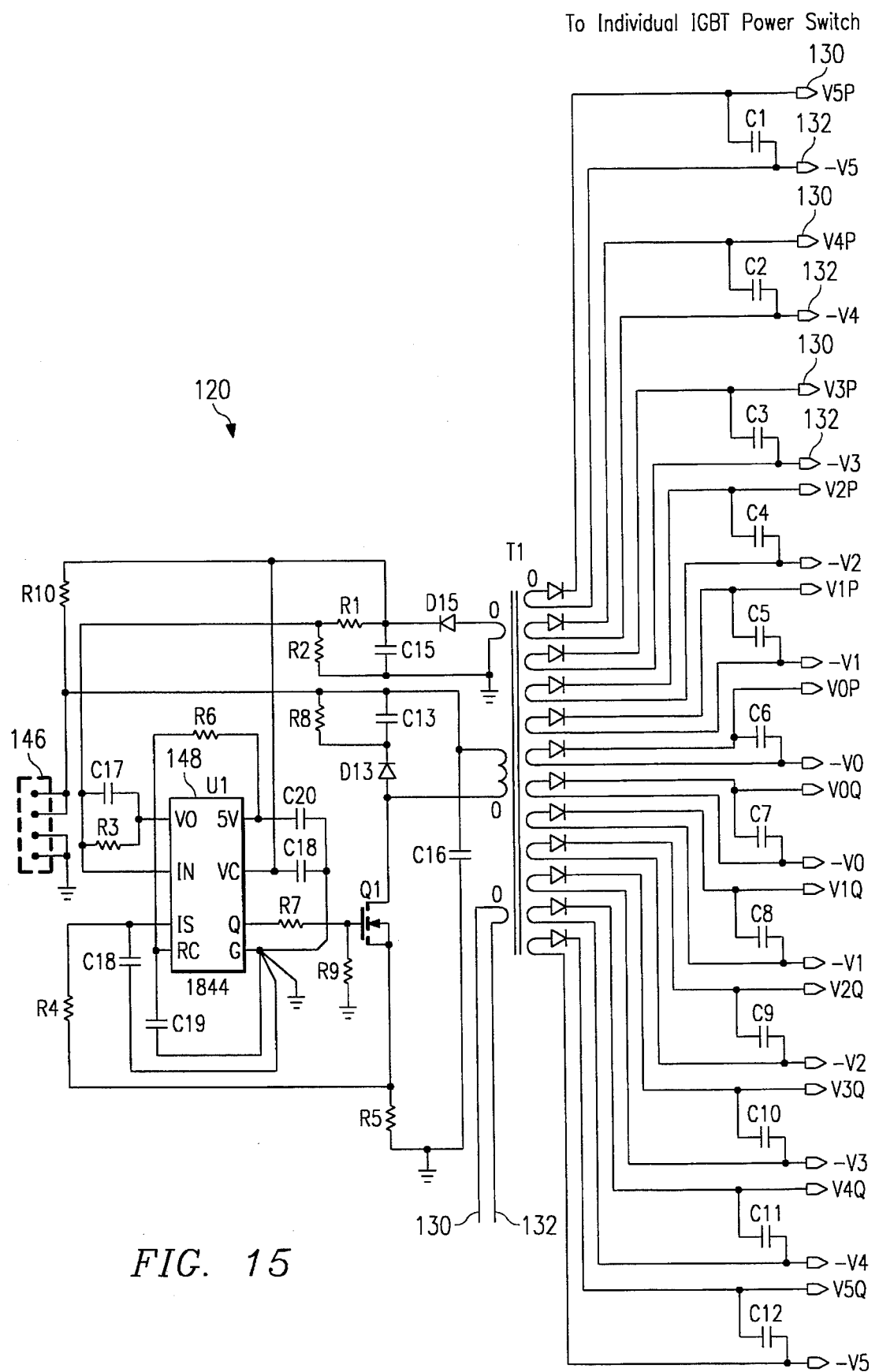
FIG. 15 is a schematic diagram of a first embodiment internal power supply of the present invention.

Referring now to FIG. 15, there is illustrated a first embodiment of the internal power supply 120 of FIGS. 12 and 13. Raw power input is supplied from the power grid via the voltage, current and phase sensing circuit of FIG. 16 at connector 146. This voltage is regulated by voltage regulator 148 which may be, for example, a part number 1844 manufactured by Unitrode. The regulated voltage output from regulator 148 is output to the individual IGBT switch/driver circuits and additional floating isolation power to the IGBT transistors via lines 130 and 132.

Figure 16B:
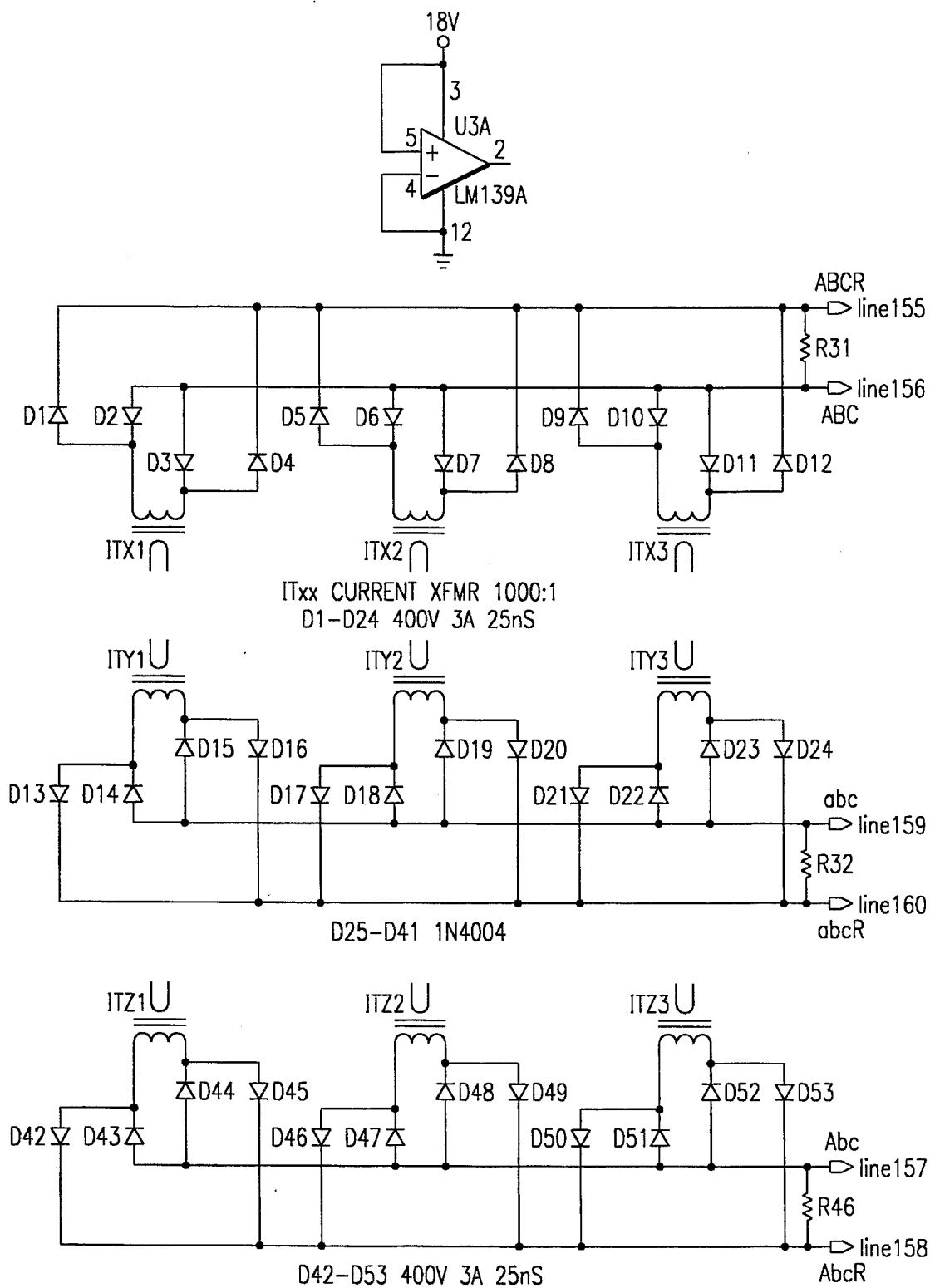
FIG. 16 is a schematic diagram of a first embodiment voltage, current and phase sensing circuit of the present invention.

Referring now to FIG. 16, them is illustrated a schematic diagram of a first embodiment of the voltage, current and phase sensing circuitry of control board 122. After the three phase input is passed through transformers T1–3, voltage sensing is performed by diodes D37–39 and comparators U3B–D. Phase sensing of the three phase input (i.e. determining which input is phase A, B and C so that input lines may be connected in any order, as is commonly known in the art) is accomplished via programmable array logic U4, transistors Q1–6 and diodes D25–36. The outputs of the voltage and phase sensing circuitry is provided on lines 150, 152 and 154 (see FIG. 17). Current sensing is performed by diode circuit D1–24 using signals from transformers ITX1–3, ITY1–3 and ITZ1–3 (see FIGS. 12 and 13). Current sensing outputs are provided on lines 156, 158 and 160 and current return is provided on lines 155, 157 and 159 (see FIG. 17).

Figure 17A:
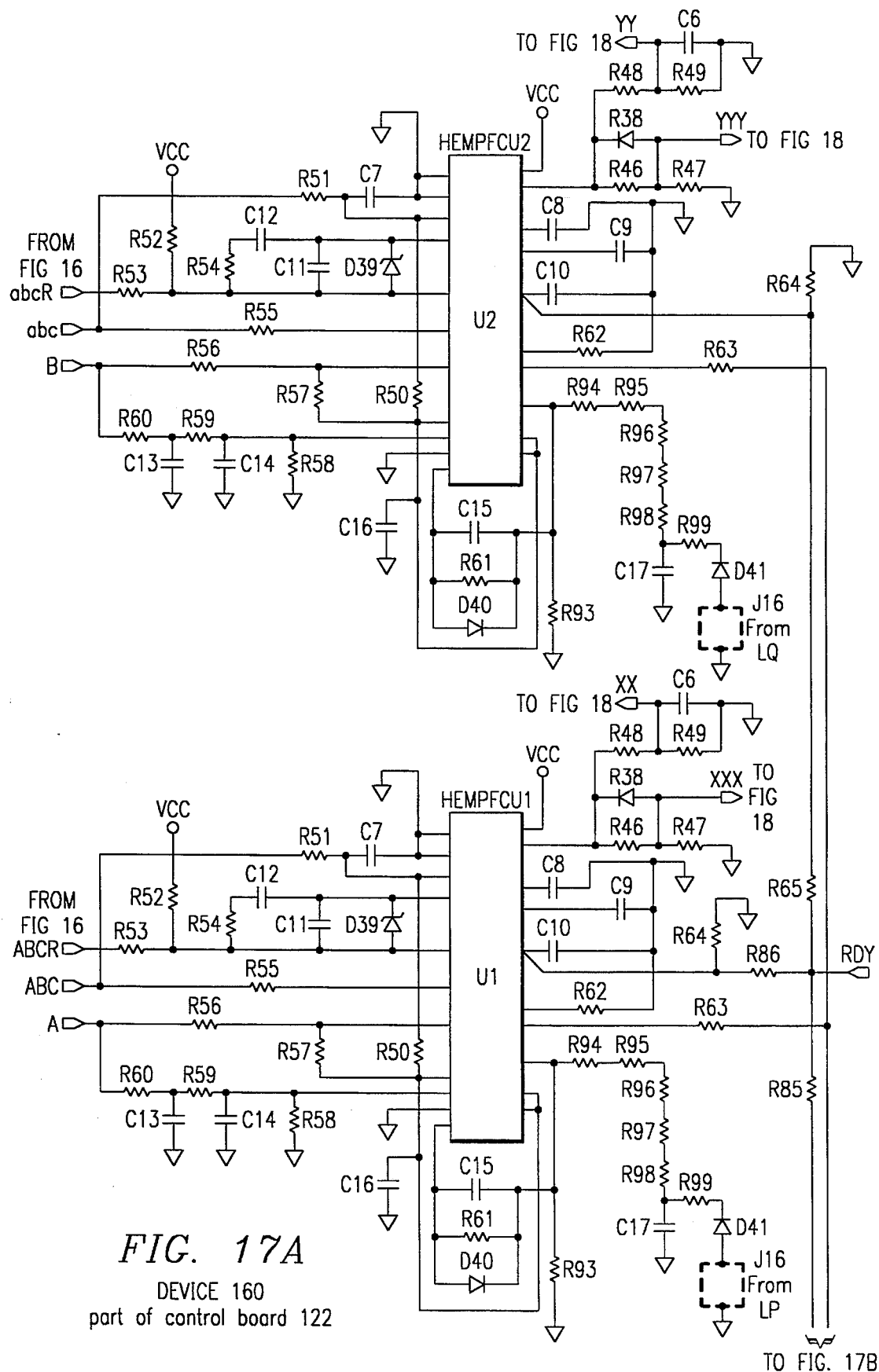
FIG. 17 is a schematic diagram of a first embodiment sinusoidal current control circuitry of the present invention.
Figure 17B:
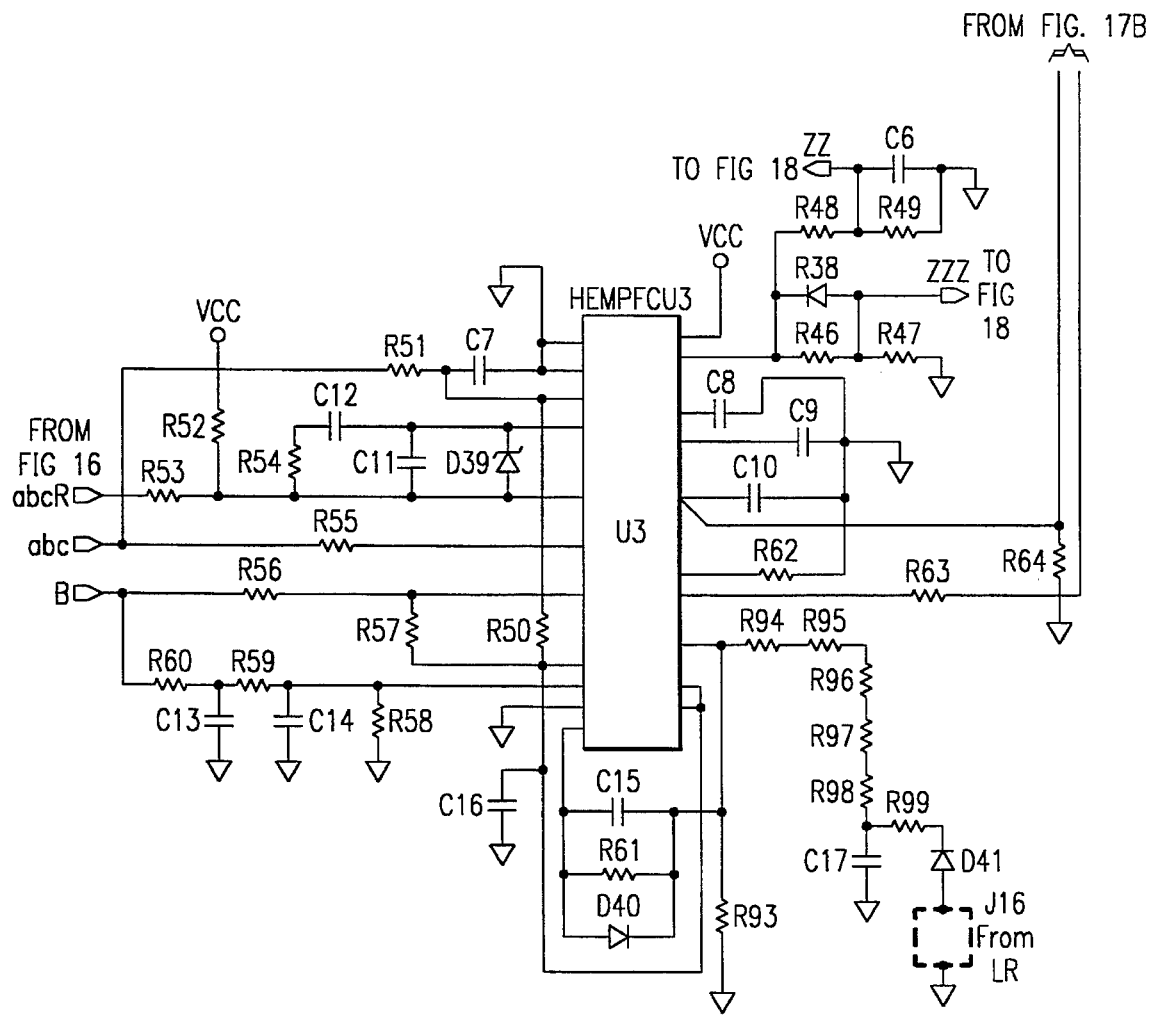

Referring now to FIG. 17, there is illustrated a schematic diagram of a first embodiment sinusoidal current control circuit of the present invention, indicated generally at 160. Sinusoidal control 160 receives voltage, current and phase sense inputs from the circuitry of FIG. 16 as indicated. Sinusoidal control 160 comprises three identical circuits for processing the A, B and C voltage signals. These sampled voltages are separated into two parts, a direct part which feeds through R56 and a filter part which feeds through R60. These two voltage signals are passed through a series of AND gates within programmable array logic U1–3, initiating a clock pulse of 45–55 microseconds which is suitable to control each degree of the 360 degrees of sine angle of a 60 Hz voltage waveform, or 21,600 Hz (60 Hz * 360 degrees=21,600 Hz).

The start and stop of this multivibrator are the feedback control via C15-R61. The initiate signals are fed from R57

(voltage) and R50 (current). The averaging currents are fed to the programmable array logic units U1–U3 to be AND'ed with an internal digitized 360 degree angle when the input current reaches the AND gate to produce the outputs XX, XXX, YY, YYY, ZZ and ZZZ (see FIG. 18). These outputs are used to turn on and turn off the device 170 of FIG. 18 in a timely manner and according to the phase shift. The circuitry to implement the phase shift control is implemented in the programmable logic arrays U1–U3 as is commonly known in the art.

Figure 18:
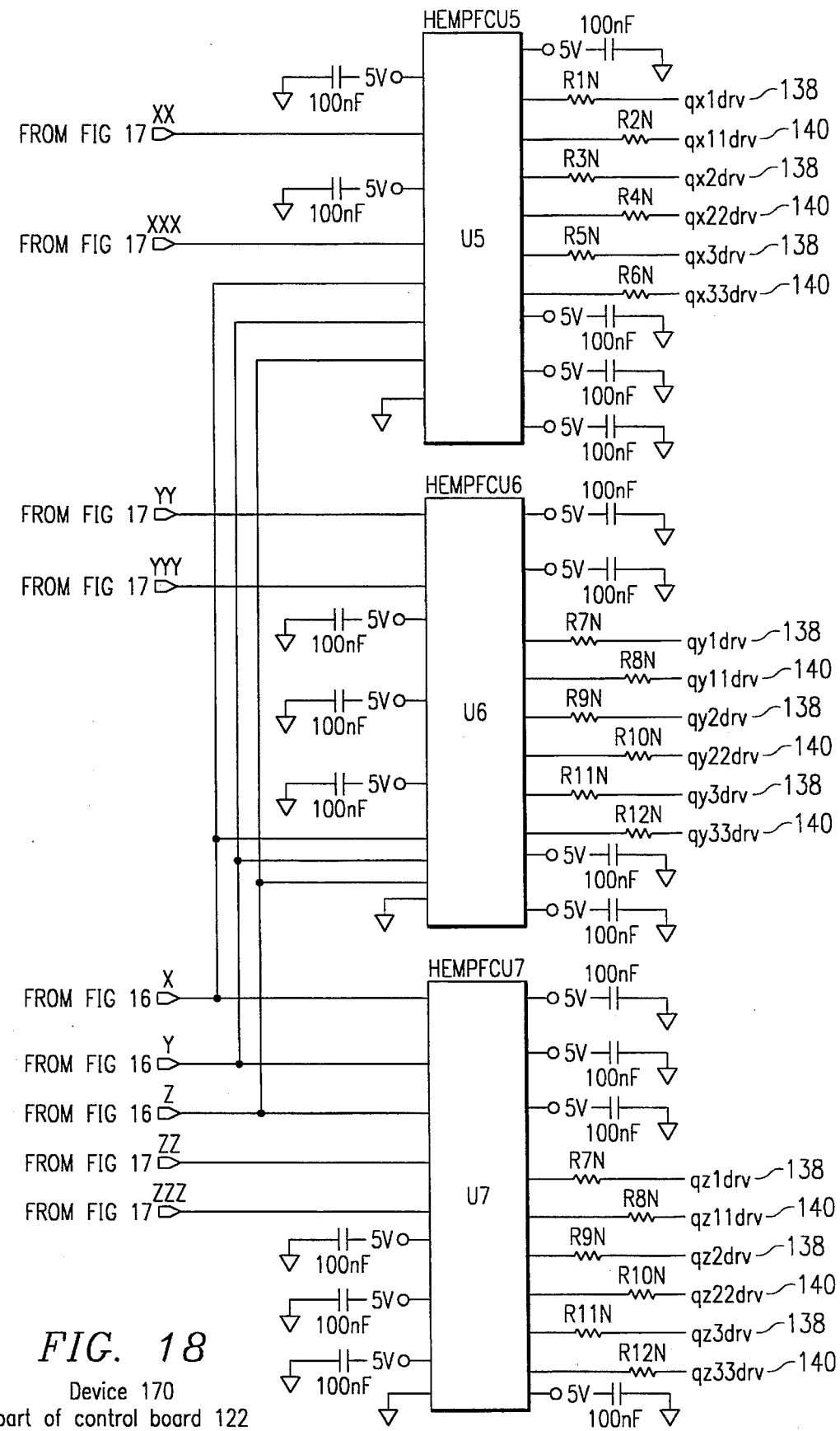
FIG. 18 is a schematic diagram of a first embodiment switching logic of the present invention.

Referring now to FIG. 18, there is illustrated a schematic diagram of a first embodiment switching logic of the present invention, indicated generally at 170. Switching logic 170 receives inputs XX, XXX, YY, YYY, ZZ and ZZZ from the sinusoidal control circuit of FIG. 17. Inputs X, Y and Z are received from the voltage, current and phase sensing circuitry of FIG. 16 and represent the phase voltages of the three phases. At each decision time (21,600 times per second in the first embodiment of the present invention) the switching logic 170 decides which of the switches P1–6, Q1–6 or R1–6 should be closed, and the appropriate driver input lines 138 or 142 are activated in order to close the appropriate switches (see FIG. 14). The decision process to open or close individual switches is made according to the invention process description detailed above with reference to FIGS. 7–11. Logic circuitry to implement this decision process is embodied in programmable logic arrays U5–7 in a manner commonly known in the art.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A device for improving power factor in a multiple phase power distribution system coupled to a load, comprising:
   at least one energy storage device;
   first switching means operatively coupled between an input of said energy storage device and each of said multiple phases;
   second switching means operatively coupled between an output of said energy storage device and each of said multiple phases; and
   control means operatively coupled to said first and second switching means, said control means operable to open or close said first switching means in order to couple said energy storage device for sinking current from at least one of said multiple phases which is supplying less than an ideal amount of current to said load, and further operable to control said second switching means in order to couple said energy storage device for sourcing current to at least one of said multiple phases which is supplying more than an ideal amount of current to said load.

2. The device of claim 1 wherein said at least one energy storage device comprises three inductors.

3. The device of claim 1 wherein said control means includes current sensing for measuring an actual amount of current being sourced by each phase.

4. The device of claim 1 wherein said control means includes means for determining said ideal amount of current.

5. The device of claim 4 wherein said ideal amount of current produces a current waveform that is in phase with a voltage waveform of said phase.

6. The device of claim 1 wherein said control means includes microprocessor means operatively coupled to said first and second switching means for opening or closing said switching means a plurality of times during each cycle of a voltage waveform of each of said phases.

7. The device of claim 1 wherein said multiple phase power distribution system is a three phase power distribution system.

8. A method for improving power factor in a multiple phase power distribution system coupled to a load, comprising the steps of:
   (a) sensing an actual voltage of each of said multiple phases;
   (b) sensing an actual current being sourced by each of said multiple phases;
   (c) calculating an ideal current value for each of said multiple phases such that each said ideal current is in phase with a respective one of said actual voltages;
   (d) coupling at least one energy storage device for sinking current from at least one of said multiple phases wherein said actual current is less than said ideal current; and
   (e) coupling said energy storage device for sourcing current to at least one of said multiple phases wherein said actual current is greater than said ideal current.

9. The method of claim 8 wherein said energy storage device comprises an inductor.

10. The method of claim 8 wherein said multiple phase power distribution system is a three phase power distribution system.

11. The method of claim 8, further comprising the step of:
   (f) decoupling said energy storage device from said multiple phases when said actual current is equal in magnitude to said ideal current.

* * * * *